(12) United States Patent
Scott et al.

(10) Patent No.: US 7,234,541 B2
(45) Date of Patent: Jun. 26, 2007

(54) DLC COATING FOR EARTH-BORING BIT SEAL RING

(75) Inventors: Danny E. Scott, Montgomery, TX (US); Chih C. Lin, Spring, TX (US); Aaron J. Dick, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 113 days.

(21) Appl. No.: 10/223,533

(22) Filed: Aug. 19, 2002

(65) Prior Publication Data

US 2004/0031624 A1 Feb. 19, 2004

(51) Int. Cl.
*E21B 10/22* (2006.01)
*E21B 10/46* (2006.01)

(52) U.S. Cl. .................. 175/57; 175/372; 175/434

(58) Field of Classification Search .............. 175/57, 175/325, 359, 371, 372, 425, 434
See application file for complete search history.

(56) References Cited

U.S. PATENT DOCUMENTS

| | | | |
|---|---|---|---|
| 4,753,304 A | | 6/1988 | Kelly, Jr. |
| 4,987,007 A | * | 1/1991 | Wagal et al. ............... 427/526 |
| 5,098,737 A | * | 3/1992 | Collins et al. ............. 427/524 |
| 5,284,394 A | | 2/1994 | Lemelson |
| 5,360,076 A | * | 11/1994 | Kelly et al. ................ 175/371 |
| 5,472,058 A | * | 12/1995 | Hooper et al. .............. 175/371 |
| 5,791,421 A | * | 8/1998 | Lin ............................ 175/371 |
| 6,033,117 A | * | 3/2000 | Cariveau et al. ............. 384/94 |
| 6,045,029 A | * | 4/2000 | Scott ....................... 228/122.1 |
| 6,068,070 A | | 5/2000 | Scott |
| 6,209,185 B1 | * | 4/2001 | Scott ........................... 29/458 |
| 6,338,881 B1 | | 1/2002 | Sellschopp et al. |
| 6,427,790 B1 | * | 8/2002 | Burr ........................... 175/371 |
| 6,450,271 B1 | * | 9/2002 | Tibbitts et al. .............. 175/374 |
| 6,513,607 B2 | * | 2/2003 | Peterson et al. ............ 175/371 |
| 6,637,528 B2 | * | 10/2003 | Nishiyama et al. ......... 175/371 |
| 2002/0108788 A1 | * | 8/2002 | Peterson et al. ............ 175/228 |
| 2003/0075363 A1 | * | 4/2003 | Lin et al. .................... 175/372 |

FOREIGN PATENT DOCUMENTS

GB 2278865 B 6/1996

OTHER PUBLICATIONS

Mechanical Seal Technology, *Diamond Seal Facing Extends Life, Improves Reliability, Reduces Friction*, Offshore, Jul. 2001.
Azom.com, *Diamond-Like Carbon Coatings*, http://www.azom.com/details.asp?ArticleID=623, May 29, 2002, pp. 1-7.

* cited by examiner

*Primary Examiner*—Jennifer H Gay
(74) *Attorney, Agent, or Firm*—Bracewell & Giuliani LLP

(57) ABSTRACT

An earth-boring bit has a seal assembly with a seal face having a DLC coating. The seal assembly locates between a bearing pin and a cone of the bit. The seal assembly has at least one rigid ring that rotates against a mating surface. The DLC coating is diamond-like carbon that may be coated by different processes onto either the ring, the mating surface, or both.

16 Claims, 2 Drawing Sheets

DLC COATING FOR EARTH-BORING BIT SEAL RING

FIELD OF THE INVENTION

This invention relates in general to earth-boring bits, especially the seals for earth-boring bits of the rolling cone variety. More particularly, the invention relates to coatings on the seal rings for enhancing wear resistance.

BACKGROUND INFORMATION

In drilling boreholes in earthen formations by the rotary method, earth-boring bits typically employ at least one rolling cone cutter, rotatably mounted thereon. The bit is secured to the lower end of a drillstring that is rotated from the surface or by downhole motors. The cutters mounted on the bit roll and slide upon the bottom of the borehole as the drillstring is rotated, thereby engaging and disintegrating the formation material. The rolling cutters are provided with teeth that are forced to penetrate and gouge the bottom of the borehole by weight from the drillstring.

As the cutters roll and slide along the bottom of the borehole, the cutters, and the shafts on which they are rotatably mounted, are subjected to large static loads from the weight on the bit, and large transient or shock loads encountered as the cutters roll and slide along the uneven surface of the bottom of the borehole. Thus, most earth-boring bits are provided with precision-formed journal bearings and bearing surfaces, as well as sealed lubrication systems to increase drilling life of bits. The lubrication systems typically are sealed to avoid lubricant loss and to prevent contamination of the bearings by foreign matter such as abrasive particles encountered in the borehole. A pressure compensator system minimizes pressure differential across the seal so that the lubricant pressure is equal to or slightly greater than the hydrostatic pressure in the annular space between the bit and the sidewall of the borehole.

A major advance in earth-boring bit seal technology occurred with the introduction of a successful rigid face seal. Rigid face seals are known in several configurations, but typically comprise at least one rigid ring, having a precision seal face ground or lapped thereon, confined in a groove near the base of the shaft on which the cutter is rotated, and an energizer member, which urges the seal face of the rigid ring into sealing engagement with a second seal face. Thus, the seal faces mate and rotate relative to each other to provide a sealing interface between the rolling cutter and the shaft on which it is mounted.

The combination of the energizer member and rigid ring permits the seal assembly to move slightly to minimize pressure fluctuations in the lubricant, and to prevent extrusion of the energizer past the cutter and bearing shaft, which can result in sudden and almost total lubricant loss. U.S. Pat. No. 4,516,641, to Burr; U.S. Pat. No. 4,666,001, to Burr; U.S. Pat. No. 4,753,304, to Kelly; U.S. Pat. No. 4,923,020 to Kelly; and U.S. Pat. No. 6,142,249 to Zahradnik et al are examples of rigid face seals for use in earth-boring bits. Rigid face seals substantially improve the drilling life of earth-boring bits of the rolling cutter variety. Earth-boring bits with rigid face seals frequently retain lubricant and thus operate efficiently longer than prior-art bits.

Because the seal faces of rigid face seals are in constant contact and slide relative to each other, the dominant mode of failure of the seals is wear. Eventually, the seal faces become pitted and the coefficient of friction between the seal faces increases, leading to increased operating temperatures, reduction in seal efficiency, and eventual seal failure, which ultimately result in bit failure. In an effort to minimize seal wear, seal rings of prior-art rigid face seals are constructed of tool steels such as 440C stainless steel, or hardenable alloys such as STELLITE. Use of these materials in rigid face seals lengthens the drilling life of bits, but leaves room for improvement of the drilling longevity of rigid face seals, and thus earth-boring bits.

Very hard, wear-resistant layers and coatings have been developed in general, such as those employing diamond. These coatings, however, generally need to be applied at high temperatures and high pressures. The coatings are applied after the steel ring has been hardened. If the high temperatures exceed the lowest transformation temperature of the steel of the ring, such as the temperature at which the steel ring has been tempered, this would adversely affect the properties of the seal ring.

U.S. Pat. No. 6,209,185 to Scott discloses applying a diamond layer to substrate, then attaching the diamond layer to the rigid ring. This avoids having to heat the hardened ring beyond its lowest transformation temperature, but it does require attachment by brazing, epoxy or the like. U.S. Pat. No. 6,045,029 to Scott discloses forming a diamond layer directly on a rigid seal ring by a process that is accomplished at a temperature lower than the lowest transformation temperature of the metal of the seal ring. This may be done in an amorphic diamond process or by forming the diamond layer separately and attaching it to the rigid ring of the seal.

SUMMARY OF THE INVENTION

In this invention, rather than a diamond coating, a diamond-like coating (DLC) is applied. A DLC coating is a form of meta-stable amorphous carbon or hydrocarbon polymer with properties very similar to those of diamond. It is a vapor deposited carbon coating with a mixture of sp3 and sp2 bonds between the carbon atoms and could be doped with alloying elements such as silicon, boron and any refractive metallic elements. The designation sp3 refers to the tetrahedral bond of carbon in diamond, while the designation sp2 is the type of bond in graphite. As DLC has a certain percentage of both, the hardness is less than diamond and between diamond and graphite.

The DLC coating is applied to the seal face of the rigid ring after it has been hardened and tempered. It is applied at a temperature lower than the lowest transformation temperature so as to not detrimentally affect the dimensions or hardness of the substrate body of the rigid ring. In one process, it is performed by the decomposition of a carbon and hydrogen compound, such as acetylene, in the presence of a plasma. The process is carried out until the coating has a thickness in the range from about 1 to 10 micrometers. The Knoop scale hardness is in the range from 2,000 to 5,000.

DETAILED DESCRIPTION OF THE INVENTION

Figure 1:
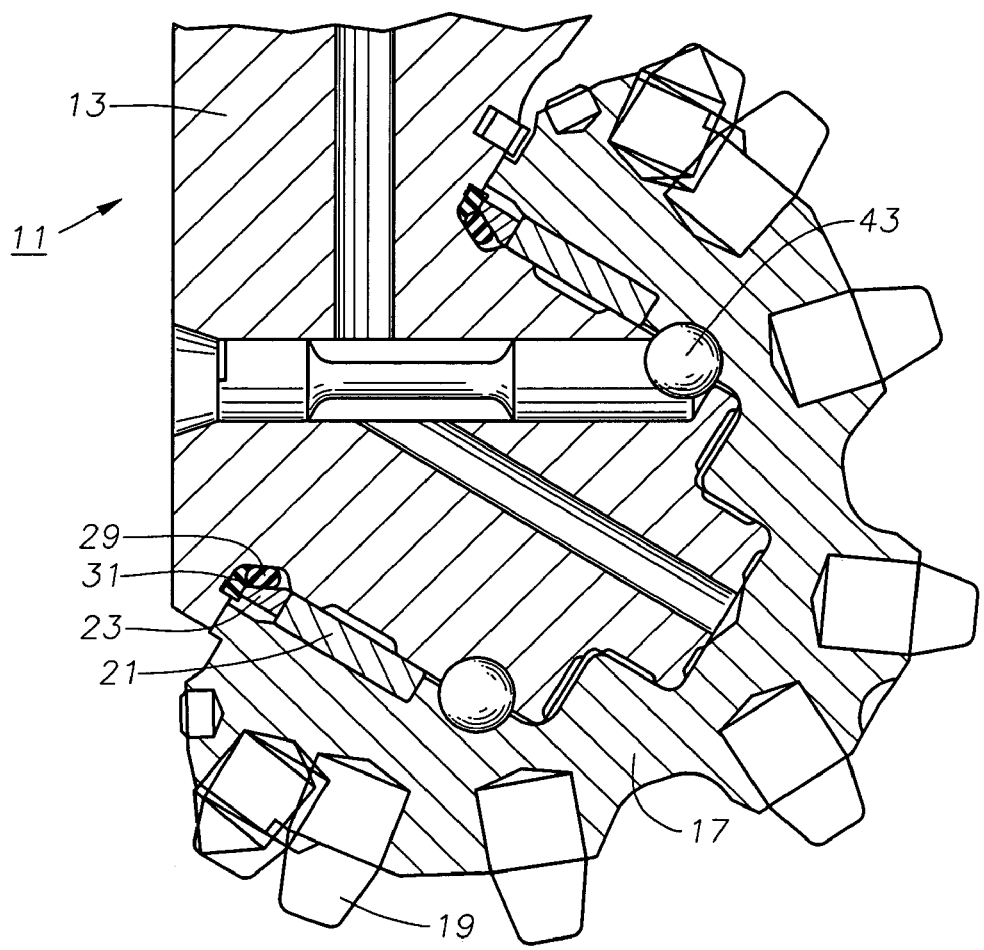
FIG. 1 is a sectional view of a portion of an earth-boring bit constructed in accordance with this invention.

Referring to FIG. 1, bit 11 has at least one bit leg 13 and normally three. Each bit leg 13 has a bearing pin 15 that extends downward and inward toward an axis of rotation of bit 11. A cutter or cone 17 mounts rotatably to bearing pin 15. Cone 17 has a plurality of teeth 19 on its exterior. Teeth 19 may be hard metal inserts pressed into mating holes in the body of cone 17, as shown. Alternately, they may be steel teeth milled into the exterior of cone 17.

Figure 2:
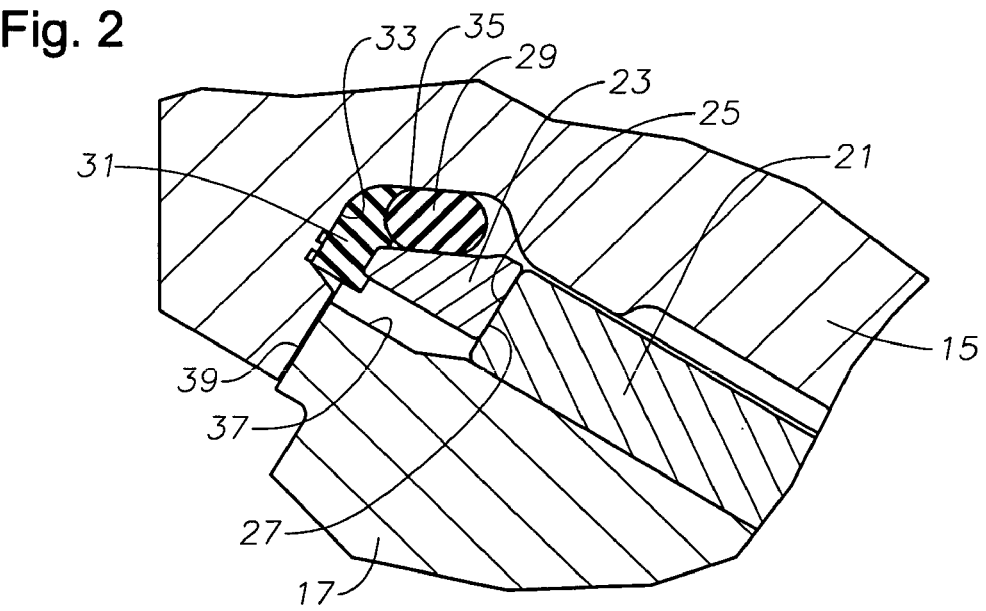
FIG. 2 is an enlarged sectional view of a portion of the bit of FIG. 1.

A bearing sleeve 21 is press-fitted into the cavity of cone 17 in this embodiment to serve as part of a seal assembly. Bearing sleeve 21 is preferably formed of a hardened ferrous metal selected from the group consisting essentially of iron with cobalt and alloys thereof, such as stainless steel or STELLITE. The seal assembly seals lubricant within the bearing spaces between bearing pin 15 and cone 17 and includes a rigid ring 23 (FIG. 2). Ring 23 is also formed preferably of a hardened metal selected from the group consisting essentially of iron, nickel, cobalt and alloys thereof, such as martensitic stainless steel or STELLITE. It may also be formed of a ceramic, fibre-reinforced or polymeric composite material such as silicone carbide and fluoroplastics. One suitable type of metal for both bearing sleeve 21 and ring 23 is 440C stainless steel. The material of rigid ring 23 and bearing sleeve 21 has a lowest transformation temperature, which is considered to be a temperature at which the metal at least partially loses its properties as a hardened metal. This temperature is about 430° C. for 440C stainless steel.

Rigid ring 23 has a seal face 25 that faces generally downward and inward substantially perpendicular to an axis of bearing pin 15. Seal face 25 engages a mating seal face 27 on bearing sleeve 21. Seal face 27 rotates with cone 17, while seal face 25 is stationary relative to bearing pin 15. An elastomeric energizing ring 29 applies a bias force to urge rigid ring 23 against bearing sleeve 21. In this embodiment, an elastomeric excluder ring 31 serves to prevent the entry of abrasive drilling fluid in contact with energizing ring 29 and the inner side of rigid ring 23. Excluder ring 31 is located at the base of bearing pin 15, in an area referred to the last machined surface 33. Energizer ring 29 is deformed between rigid ring 23 and a seal recess 35 located on bearing pin 15. Rigid ring 23, energizing ring 29, and excluder ring 31 are spaced radially inward from a cavity 37 of cone 17 adjacent the mouth. Rigid ring 23, energizing ring 29, and excluder ring 31 do not rotate relative to bearing pin 15. A small gap 39 is located between a portion of last machined surface 33 and the back face of cone 17 to avoid sliding contact between the backface and the last machined surface 33. The seal assembly blocks drilling mud that enters through gap 39 from passing into the bearing spaces between bearing pin 15 and cone 17.

A coating of DLC material is applied to at least one of the seal faces 25, 27, and preferably to seal face 27. As discussed above, DLC, or diamond-like carbon, is a form of metastable amorphous carbon or hydrocarbon compound with properties very similar to those of diamond. Being amorphous, there are no grain boundaries. DLC coating is a carbon coating with a mixture of sp3 and sp2 bonds between the carbon atoms. The sp3 bond is a tetrahedral bond of carbon that forms diamond. The sp2 bond is of a type that forms graphite. Technically, the sp3 bond means that the carbon reconfigures one s-orbit and three p-orbits to form four identical orbits in a tetrahedral configuration for bonding to the next carbon atom. The sp2 bond is the hybridization of one s and two p-orbits to three sp2 orbits, which are planar. DLC has a certain percentage of both types of bonds, thus the hardness is between diamond and graphite. The proportions of sp2 and sp3 can be varied. In addition to carbon, there is a certain amount of hydrogen in the DLC coatings. The hydrogen content comes from the process gas used, since normally DLC coatings are deposited by the decomposition of a carbon and hydrogen compound. One acceptable compound is acetylene.

The rigid ring 23 is first hardened and tempered and formed to the desired dimensions. Portions of ring 23 that are not to be coated are masked off. One process to coat face 27 comprises the deposition of material from an RF (radio frequency) plasma, sustained in hydrocarbon gases, onto negatively biased ring 23. In this process, referred to as a plasma assisted chemical vapor deposition or PACVD, ring 23 is heated by an electron current to a temperature below their lowest transformation temperature. Electrons from the electron current are attracted to face 27 from a plasma beam in the center of the chamber. After heating, face 27 is etched by argon ion bombardment. For this, ring 23 is biased to a negative potential to attract argon ions from a plasma source. This process cleans the surfaces by etching.

Afterward, one or more metallic interlayers, usually chromium, is applied from a sputter source such as a chromium target. Sputtering is a similar process to etching, but a bias voltage is applied to the chromium target of several hundred volts. Face 27 serves as a negative electrode. Material is removed from the chromium target surface by the impact of argon ions, this material condensing on face 27. The metallic interlayer is used to increase adhesion and could be formed of other metals such as titanium.

After the interlayer is laid, acetylene is introduced and a plasma is ignited between face 27 and the chamber walls. The acetylene decomposes to form carbon atoms that coat face 27 on the metallic interlayer with DLC. DLC coatings are insulating, thus the plasma for the DLC cannot be a DC plasma, but must be an AC plasma. Typically an RF plasma is used. After coating, ring 23 is cooled before venting the chamber. During the entire coating process, the temperature will be maintained below the lowest transformation temperature of ring 23. If bearing sleeve 21 is coated with DLC, the same process would apply.

In addition to the process described above, other processes are suitable, including primary ion beam deposition of carbon items (IBD). Another process that may be suitable is sputter deposition of carbon with or without bombardment by an intense flux of ions (physical vapor deposition). Another technique is based on closed field unbalanced magnetron sputter ion plating combined with plasma assisted chemical vapor deposition. The deposition is carried out at approximately 200° C. in a closed field unbalanced magnetron sputter ion plating system.

The DLC coating on seal face 27 preferably has a thickness in the range from 1 to 10 micrometers, preferably 2 to 5 micrometers and, even more specifically, 2 to 3 micrometers. The hardness is in the range from 2,000 from 5,000 Knoop, thus not as hard as diamond. Once the coating is placed on seal face 27, rigid ring 23 is installed with energizing ring 29 and excluder ring 31. Cutter or cone 17 is installed on bearing pin 15 in a conventional manner.

Laboratory tests have been conducted to demonstrate the performance of the coating. First, thrust washer pressure-velocity tests were carried out. In one test, an uncoated stainless steel 440C thrust washer ran against a mating surface that was coated with DLC to a thickness of 2 to 3 micrometers. This pressure velocity tests showed that the DLC coating more than doubled the load carrying capacity of the component. The average load at the pressure velocity limit for the standard was 704 Newtons, while the DLC coating had an average load at the pressure velocity limit of greater than 1900 Newtons.

Figure 3:
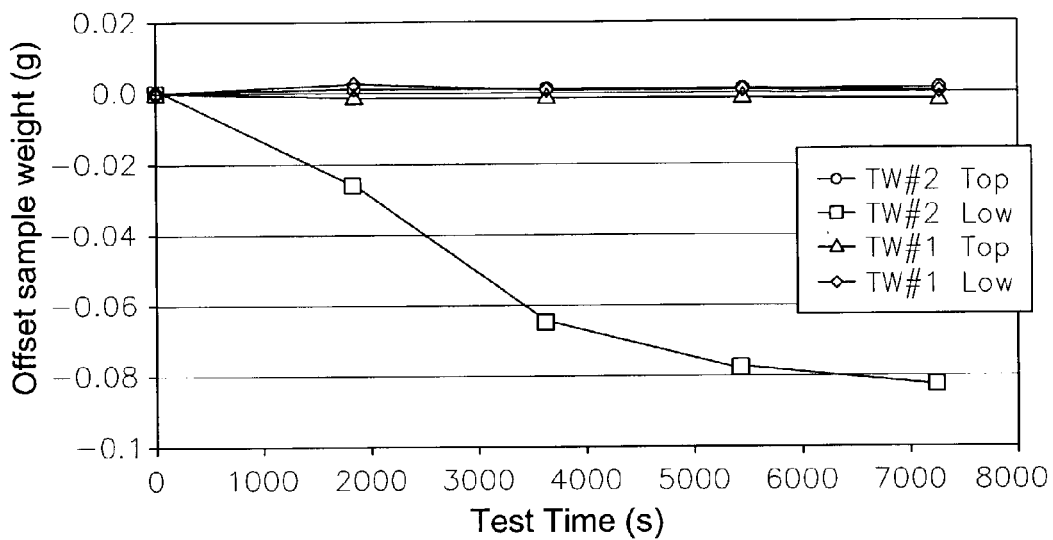
FIG. 3 is a graph illustrating a thrust wear test.

Then, a wear test was carried out to demonstrate the wear resistance of the coating. The results are shown in FIG. 3. The designation TW1 top and low refers to two thrust washers rotated against one another, with one of the thrust washers having a DLC coating and the other being uncoated 440C stainless steel. When rotated against one another, the TW1 thrust washers exhibited very little weight loss after a two-hour test interrupted at 30 minute intervals (1800 seconds) to make a weight loss measurement. The other specimens, designated TW2, had both top and bottom washers of 440C stainless steel without any DLC coatings. The bottom or lower thrust washer wore significantly during the two-hour test.

Figure 4:
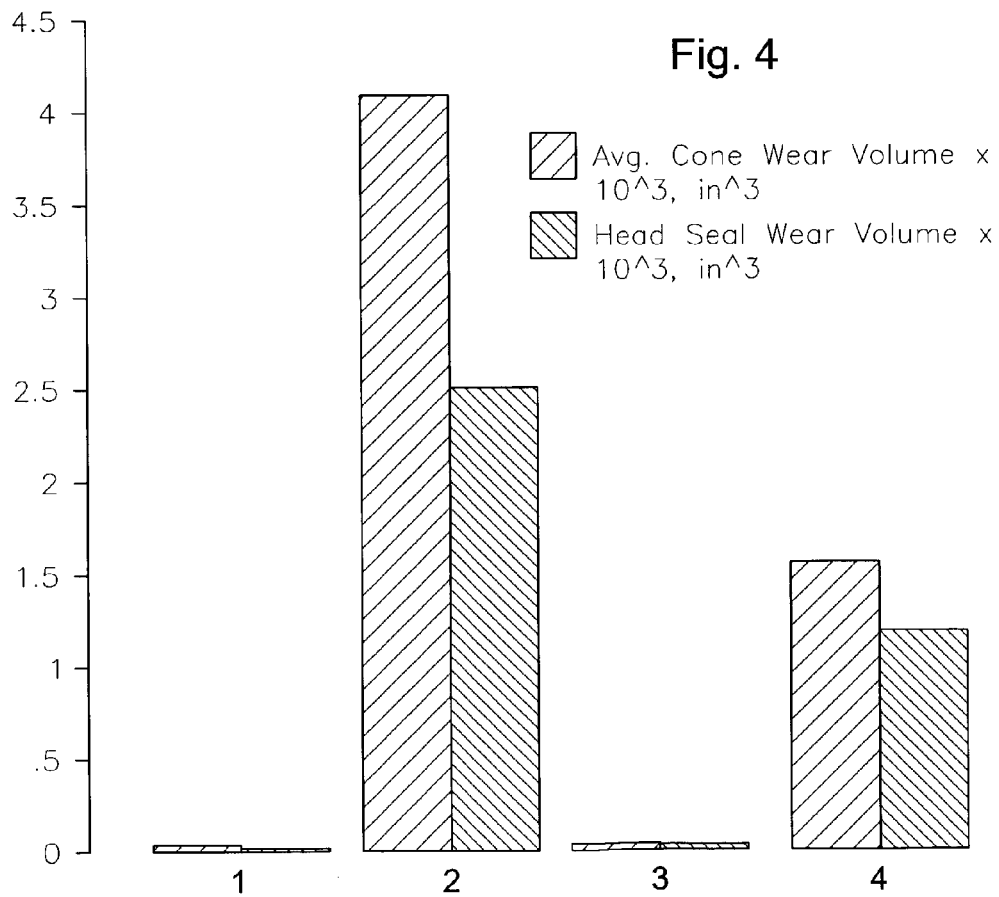
FIG. 4 is a graph illustrating the results of a seal wear test.

Also, seal wear tests were run. In the seal wear test, full-scale, actual seal rings of a type that would actually be utilized in an earth-boring bit were tested. The test was run under pressure at rotational speeds of 449 rotations per minute to simulate that of actual drilling conditions. The specimens were immersed in a tank with water based drilling mud and a 3.5% sand content. FIG. 4 illustrates the results. All of the tests utilized head seals of 440C uncoated stainless steel. Test numbers 1 and 3 utilized DLC coatings on mating 440C stainless steel surfaces while test numbers 2 and 4 utilized 440C stainless steel running against 440C stainless steel. Test numbers 1 and 2 had a face load of 150 pounds while test numbers 3 and 4 had face loads of 229 and 224 pounds, respectively. As can be seen, the wear was very low on both the head seal and the mating surface for test numbers 1 and 3. The wear was significantly greater in tests 2 and 4 than in tests 1 and 3.

The invention has significant advantages. The DLC coating is applied in a process that does not detract from the properties of the substrate. The DLC coating exhibits high wear resistance, with the graphite component in the DLC coating enhancing lubrication.

While the invention has been shown in only one of its forms, it should be apparent to those skilled in the art that it is not so limited but is susceptible to various changes without departing from the scope of the invention.

The invention claimed is:

1. An earth-boring bit, comprising:
a bit body;
a cantilevered bearing shaft depending from the bit body and including a journal bearing surface supplied with lubricant;
a cone mounted for rotation on the bearing shaft, the cone including a mating bearing surface for engagement with the journal bearing surface of the bearing shaft;
a seal assembly mounted between the cone and the bearing shaft for sealing the lubricant within the journal bearing surface, the seal assembly having at least one rigid, steel alloy ring having a first seal face biased against a second seal face; and
the first seal face having a metallic interlayer of chromium or titanium formed thereon and a diamond-like carbon coating formed on the metallic interlayer.

2. The bit according to claim 1, wherein the coating has a thickness in the range from 1 to 10 micrometers.

3. The bit according to claim 1, wherein the coating has a thickness in the range from 2 to 5 micrometers.

4. The bit according to claim 1, wherein the coating has a Knoop Scale hardness in the range from 2000 to 5000.

5. The bit according to claim 1, wherein the coating is of carbon with a mixture of sp3 and sp2 bonds between atoms of the carbon.

6. The bit according to claim 1, wherein the coating is formed of amorphous and hydrogenated amorphous carbon.

7. A method for constructing an earth-boring bit, comprising:

(a) providing a bit body with at least one cantilevered bearing shaft that has a base and extends inwardly and downward from the bit body;
(b) forming a least one rigid seal ring;
(c) depositing a metallic interlayer on the seal face of the rigid seal ring, then a diamond-like carbon coating on the metallic interlayer by a plasma assisted chemical vapor deposition process comprising introducing a carbon and hydrogen compound in the presence of a radio frequency plasma onto the metallic interlayer on the seal face; then
(d) mounting the rigid seal ring on the bearing shaft proximal to the base of the bearing shaft and biasing the seal face of the rigid seal ring in contact with a second seal face; and
(e) mounting a cone on the bearing shaft for rotation, the cone having an interior containing lubricant sealed by the seal faces.

8. The method according to claim 7, wherein the metallic interlayer deposited on the seal face in step (c) comprises chromium or titanium.

9. The bit according to claim 7, wherein step (c) is performed until the coating has a thickness in the range from 2 to 5 micrometers.

10. The bit according to claim 7, wherein step (c) is performed until the coating has a thickness in the range from 2 to 3 micrometers.

11. The bit according to claim 7, wherein the ring is formed of a hardened metal selected from the group consisting essentially of iron, nickel, cobalt and alloys thereof, and has a lowest transformation temperature at which the metal at least partially loses its properties as a hardened metal, and step (c) is performed below the lowest transformation temperature.

12. A method for constructing an earth-boring bit, comprising:

(a) providing a bit body with at least one cantilevered bearing shaft that has a base and extends inwardly and downward from the bit body;
(b) forming a least one rigid seal ring of a steel alloy, the seal ring having a seal face, and the metal of the ring having a lowest transformation temperature at which the hardened metal at least partially loses its properties as a hardened metal;
(c) applying a metallic interlayer comprising chromium or titanium to the seal face by a sputtering process;
(d) applying a diamond-like carbon coating to the metallic interlayer on the seal face while maintaining the temperature during the process below the lowest transformation temperature of the metal of the ring;
(e) mounting the ring on the bearing shaft proximal to the base of the bearing shaft and positioning the seal face of the ring in contact with a second seal face; and
(f) mounting a cone on the bearing shaft for rotation, the cone having an interior filled with lubricant sealed by the seal faces.

13. The method according to claim 12, wherein step (d) is performed until the coating has a thickness in the range from 1 to 10 micrometers.

14. The method according to claim 12, wherein step (d) is performed until the coating has a thickness in the range from 2 to 5 micrometers.

15. The method according to claim 12, wherein step (d) is performed until the coating has a thickness in the range from 2 to 3 micrometers.

16. A method for constructing an earth-boring bit, comprising:

(a) providing a bit body with at least one cantilevered bearing shaft that has a base and extends inwardly and downward from the bit body;
(b) forming a least one rigid seal ring of a steel alloy, the seal ring having a seal face, and the metal of the ring having a lowest transformation temperature at which the hardened metal at least partially loses its properties as a hardened metal;
(c) applying a metallic interlayer to the seal face;
(d) applying a diamond-like carbon coating to the metallic interlayer on the seal face in a process utilizing a plasma and decomposition of a hydrogen and carbon material while maintaining the temperature during the process below the lowest transformation temperature of the metal of the ring;
(e) mounting the ring on the bearing shaft proximal to the base of the bearing shaft and positioning the seal face of the ring in contact with a second seal face;
(f) mounting a cone on the bearing shaft for rotation, the cone having an interior filled with lubricant sealed by the seal faces; and
wherein step (c) is performed by a sputtering process.

* * * * *

UNITED STATES PATENT AND TRADEMARK OFFICE
CERTIFICATE OF CORRECTION

| | |
|---|---|
| PATENT NO. | : 7,234,541 B2 |
| APPLICATION NO. | : 10/223533 |
| DATED | : June 26, 2007 |
| INVENTOR(S) | : Danny E. Scott et al. |

It is certified that error appears in the above-identified patent and that said Letters Patent is hereby corrected as shown below:

<u>In the Specification:</u>

Column 3, line 15, delete "silicone" and insert --silicon--

Signed and Sealed this

Twentieth Day of November, 2007

JON W. DUDAS
*Director of the United States Patent and Trademark Office*